(12) United States Patent
Petersson et al.

(10) Patent No.: US 12,538,137 B2
(45) Date of Patent: Jan. 27, 2026

(54) ACTIVE ANTENNA SYSTEM

(71) Applicant: Sago Strategic Solutions LLC, Wilmington, DE (US)

(72) Inventors: Sven Petersson, Sävedalen (SE); Bo Hagerman, Tyresö (SE); Martin Johansson, Mölndal (SE); Stefan Johansson, Romelanda (SE)

(73) Assignee: Sago Strategic Solutions LLC, Wilmington, DE (US)

( * ) Notice: Subject to any disclaimer, the term of this patent is extended or adjusted under 35 U.S.C. 154(b) by 475 days.

(21) Appl. No.: 17/924,875

(22) PCT Filed: Apr. 21, 2021

(86) PCT No.: PCT/EP2021/060456
§ 371 (c)(1),
(2) Date: Nov. 11, 2022

(87) PCT Pub. No.: WO2021/228524
PCT Pub. Date: Nov. 18, 2021

(65) Prior Publication Data
US 2023/0189018 A1 Jun. 15, 2023

Related U.S. Application Data

(63) Continuation of application No. 16/872,141, filed on May 11, 2020, now Pat. No. 10,911,963.

(51) Int. Cl.
*H04W 16/28* (2009.01)
*H01Q 3/28* (2006.01)
*H01Q 3/34* (2006.01)
(52) U.S. Cl.
CPC ............. *H04W 16/28* (2013.01); *H01Q 3/28* (2013.01); *H01Q 3/34* (2013.01)

(58) Field of Classification Search
CPC ............ H04W 16/28; H01Q 3/28; H01Q 3/34
(Continued)

(56) References Cited

U.S. PATENT DOCUMENTS 9,306,270 B2 * 4/2016 Schmidt ................. H01Q 1/246
9,819,096 B2 * 11/2017 Veihl ................... H01Q 21/0006
(Continued)

FOREIGN PATENT DOCUMENTS

WO 2021228524 A1 11/2021

OTHER PUBLICATIONS

5G Americas, "Advanced Antenna Systems for 5G," White Paper, Aug. 2019, 5G Americas, 59 pages.
(Continued)

*Primary Examiner* — April G Gonzales
(74) *Attorney, Agent, or Firm* — Thorpe North & Western, LLP.

(57) ABSTRACT

The present invention relates to an active antenna system, AAS, for controlling coverage in a telecommunication network, and the AAS comprising a plurality of subarrays each having multiple radiating elements. The AAS is configured to provide coverage in a coverage angular range and the plurality of subarrays comprising at least two types of subarrays. The at least two types of subarrays comprises: a first type of subarray with a first radiation pattern having at least a first angular region with gain below a first threshold value, and a second type of subarray with a second radiation pattern having at least a second angular region with gain below a second threshold value, wherein the second radiation pattern deviates from the first radiation pattern and the first angular region in the first radiation pattern differs from the second angular region in the second radiation pattern.

20 Claims, 10 Drawing Sheets

(58) Field of Classification Search
USPC ........................................................ 455/101
See application file for complete search history.

(56) References Cited

U.S. PATENT DOCUMENTS

| | | | | |
|---|---|---|---|---|
| 9,831,548 | B2* | 11/2017 | Timofeev | H01Q 3/30 |
| 10,062,966 | B2* | 8/2018 | Mangenot | H01Q 21/22 |
| 10,382,110 | B2* | 8/2019 | Seifi | H04L 5/0051 |
| 10,446,925 | B2* | 10/2019 | Petersson | H04B 7/0617 |
| 10,911,963 | B1* | 2/2021 | Petersson | H01Q 3/34 |
| 12,052,657 | B2* | 7/2024 | Garcia Martin | H04W 36/14 |
| 2009/0312057 | A1* | 12/2009 | Moon | H01Q 1/246 |
| | | | | 455/562.1 |
| 2019/0327632 | A1* | 10/2019 | Kim | H04B 7/0456 |

OTHER PUBLICATIONS

Akbar, et al., "Scan loss mitigation via subarrays: A full-scale concept demonstrator," Proceedings of the 47th European Microwave Conference, Oct. 10-12, 2017, Nuremburg, Germany, EuMA, pp. 156-159.

Guo, et al., "MIMO Transmission With Vertical Sectorization for LTE-A Downlink," IEEE Wireless Communications Letters, vol. 5, Issue 4, Apr. 29, 2016, 4 pages.

Mailloux, et al., "Irregular Polyomino-Shaped Subarrays for Space-Based Active Arrays," International Journal of Antennas and Propagation, vol. 2009, Feb. 2009, Hindawi Publishing Corporation, 9 pages.

Nadeem, et al., "Elevation Beamforming with Full Dimension MIMO Architectures in 5G Systems: A Tutorial," IEEE Communications Surveys & Tutorials, vol. 21, Issue 4, Jul. 23, 2019, 37 pages.

Tzanidis, et al., "2D Active Antenna Array Design for FD-MIMO System and Antenna Virtualization Techniques," International Journal of Antennas and Propagation, vol. 2015, Jul. 27, 2015, Hindawi Publishing Corporation, 9 pages.

Notice of Allowance for U.S. Appl. No. 16/872,141, mailed Nov. 3, 2020, 8 pages.

International Search Report and Written Opinion for International Patent Application No. PCT/EP2021/060456, mailed Jun. 25, 2021, 12 pages.

* cited by examiner

ACTIVE ANTENNA SYSTEM

This application is a 35 U.S.C. § 371 national phase filing of International Application No. PCT/EP2021/060456, filed Apr. 21, 2021, which claims the benefit of U.S. application Ser. No. 16/872,141, now U.S. Pat. No. 10,911,963, filed May 11, 2020, the disclosures of which are incorporated herein by reference in their entireties.

TECHNICAL FIELD

The present disclosure relates to the field of active antenna systems, AAS, for controlling coverage in a telecommunication network. More particularly the invention relates to improving the coverage by adjusting the maximal gain envelope pattern for the AAS.

BACKGROUND

In 5G mobile communication systems, advanced antenna system or active antenna system, AAS, is a key component to improve capacity and coverage by making use of the spatial domain.

An AAS for mobile cellular communication networks is normally required to have a broad primary coverage angular range in the horizontal plane, typically $\varphi=\pm 60°$, where $\varphi$ is the azimuthal angle measured from the antenna broadside direction. In the vertical plane, the primary coverage angular range is significantly smaller. The vertical angular range for the primary coverage depends typically on cell size, height position of the AAS, user distribution, and path loss. The primary coverage angular range is here defined as the angular range where the AAS is to ensure high antenna gain and by that high Effective Isotropic Radiated Power, EIRP, and Effective Isotropic Sensitivity, EIS.

Figure 1:
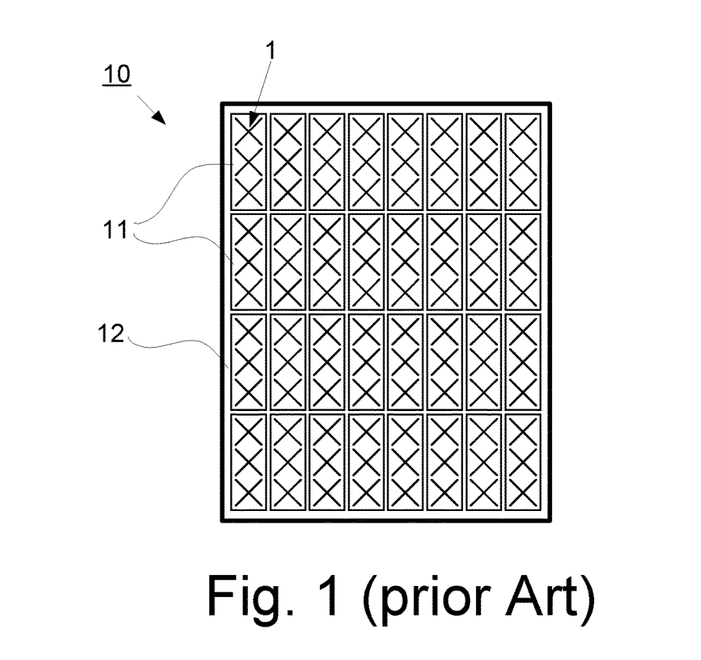
FIG. 1 illustrates a prior art active antenna system, AAS, with an 8 times 4 array consisting of vertical subarrays, each subarray having three radiating elements.

Therefore, an AAS 10 typically consists of an array of vertical sub-arrays 11, all identical, as illustrated in FIG. 1, in order to optimize the array aperture and number of radio chains with respect to the desired primary coverage angular range. Each subarray 11 comprises multiple radiating elements 1 and the subarrays are arranged on an antenna surface 12.

The radiation properties of an AAS of this type can approximately be written as $$\vec{E}(\theta, \varphi) \approx \vec{g}(\theta, \varphi) \cdot \sum_{n=1}^{N} I_n \cdot e^{jk \cdot r_n} = \vec{g}(\theta, \varphi) \cdot AF(\theta, \phi) \qquad (1)$$

where
$I_n$=excitation coefficient of n'th antenna sub-array (beamforming weight)
$\vec{g}(\theta, \varphi)$=radiation pattern of the sub-arrays
$r_n$=position of the n'th sub-array
k=direction vector as a function of $\theta$ and $\varphi$ scaled with $2\pi$/lambda
and $$AF(\theta, \varphi) = \text{Array Factor} = \sum_{n=1}^{N} I_n \cdot e^{jk \cdot r_n}$$

That is, for an array of sub-arrays of this type the radiation properties are proportional to the sub-array pattern times the array factor.

Even though it is within the primary coverage angular range the AAS is to be optimized for high antenna gain, there is also a secondary coverage angular range where the AAS must have reasonable antenna gain in order to be able to properly serve all user equipment UEs within the cell.

Figure 2:
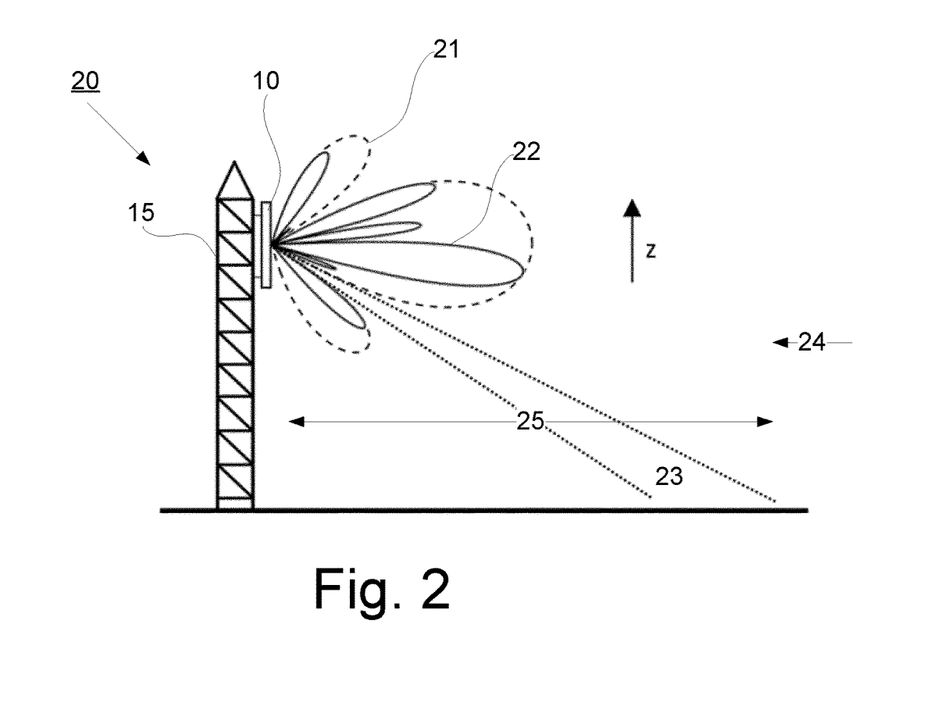
FIG. 2 illustrates an AAS placed on a site together with a schematic view of radiation patterns.

FIG. 2 illustrates a node 20 with an AAS 10, as illustrated in FIG. 1, placed on a mast 15 at a site together with a schematical view of a vertical cut of a radiation pattern 22 for the AAS 10, illustrated by solid lines, as well as a radiation pattern 21 for one subarray 11, illustrated by dashed lines. Dotted lines indicate angular interval in elevation where the subarray pattern low gain region 23 impedes the coverage of the AAS 10.

To compensate for the path loss the antenna gain should be optimized to the regions close to the cell border, i.e. a primary coverage angular range 24, while closer to the site the path loss is significantly less, and the same link budget can be kept with a significantly less antenna gain. The latter can be seen as a secondary coverage angular range 25 in the vertical plane, where a reasonable antenna gain must be ensured.

Consider now equation (1), where the active antenna system has the excitation coefficients (beamforming weights) $I_n$ that in principal can be selected to optimize the array factor, AF, in any direction, but of course within the limits given by the selected array geometry. Thus, the array factor is not a direct limiting factor to obtain reasonable coverage in the secondary coverage angular region 25.

However, a limiting factor for the AAS antenna gain in the secondary coverage angular range will be the antenna radiation pattern 21 of the sub-arrays 11, and particularly if the subarray pattern has more or less nulls in some direction, a low gain region 23 is present within the secondary coverage angular range 25. These nulls are set by the hardware design of the sub-array 11 and are therefore independent of the selected beamforming weights. Thus, the AAS will not be able to generate reasonable coverage in these directions, defined by the low gain region 23, and there will be poor coverage for the UE's there.

Irregular subarrays, sparse arrays, etc. are sometimes considered for applications such as radar- and communication systems with the purpose to reduce the number of array elements/sub-arrays while maintaining proper main beam coverage and low side lobe levels. In these systems traffic is confined to angular regions where beams with high gain can be designed. In practice this means that the coverage regions fall within the main beam of the subarrays. This contrasts with a mobile telecommunications system where there is also a secondary coverage angular range where the AAS must have reasonable antenna gain in order to properly serve all UEs within a cell. This means in practice that for these mobile telecommunications systems the secondary coverage angular range can fall outside the main beam of the subarray.

SUMMARY

An object of the present disclosure is to provide an active antenna system which seeks to mitigate, alleviate, or eliminate one or more of the above-identified deficiencies in the art and disadvantages singly or in any combination and to provide improved coverage in a telecommunication network.

This object is obtained by an active antenna system, AAS, for controlling coverage in a telecommunication network, wherein the AAS comprising a plurality of subarrays each having multiple radiating elements. The AAS is configured to provide coverage in a coverage angular range and the plurality of subarrays comprising at least two types of subarrays. The at least two types of subarrays comprising: a first type of subarray with a first radiation pattern having at least a first angular region with gain below a first threshold value, and a second type of subarray with a second radiation pattern having at least a second angular region with gain below a second threshold value, wherein the second radiation pattern deviates from the first radiation pattern and the first angular region in the first radiation pattern differs from the second angular region in the second radiation pattern.

According to an aspect, the first radiation pattern has a gain above the first threshold value in the second angular region and/or the second radiation pattern has a gain above the second threshold value in the first angular region.

According to an aspect, subarrays with different radiation patterns may be created by letting subarrays have: different phase taper and/or amplitude taper and/or different height and/or different element separation and/or different number of radiating elements.

This object is also achieved by a method for controlling coverage in a telecommunication network using nodes with an active antenna system, AAS, and the AAS comprises a plurality of subarrays each having multiple radiating elements. The AAS is configured to provide coverage in a coverage angular range and the plurality of subarrays comprising at least two types of subarrays. The method comprising: configuring a first type of subarray with a first radiation pattern having at least a first angular region with gain below a first threshold value, configuring a second type of subarray with a second radiation pattern having at least a second angular region with gain below a second threshold value, and selecting the second radiation pattern to deviate from the first radiation pattern to ensure that the first angular region in the first radiation pattern differs from the second angular region in the second radiation pattern.

This object is also achieved by a node in a telecommunication network comprising an active antenna system, AAS, as defined above.

An advantage with the present disclosure is enhanced coverage in a secondary angular coverage range.

Further objects and advantages are disclosed in the detailed description.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIGS. 9a and 9b respectively illustrate maximal vertical gain envelope pattern for the antenna array, and the subarray radiation pattern of the type of subarray in FIG. 8a;

FIGS. 13a and 13b respectively illustrate maximal vertical gain envelope pattern for the antenna array, and the subarray radiation pattern of the type of subarray in FIG. 12a;

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

This disclosure relates to active antenna systems, AAS, consisting of an array of subarrays and in specific to methods for reducing the impact of low gain regions, that may include nulls, of subarray pattern on the AAS spatial radiation coverage. This objective is achieved by designing some of the subarrays to have different radiation patterns compared to the other subarrays in the AAS in order to avoid that all subarrays have low gain, e.g. null-depths, in the same direction.

Four principal different embodiments are proposed for an AAS:

Using subarrays with same physical properties, i.e. same size (height) and same number of radiating elements, and configuring some of the subarrays to have different phase taper (sub-array tilt), and/or amplitude taper. This is exemplified in FIG. 3.

Using subarrays with the same number of radiating elements having different element separations to obtain subarrays having different size (height). This is exemplified in FIGS. 4, 5a and 5b.

Using subarrays with different number of radiating elements to obtain subarrays having different size (height). This is exemplified in FIG. 6.

Figure 7:
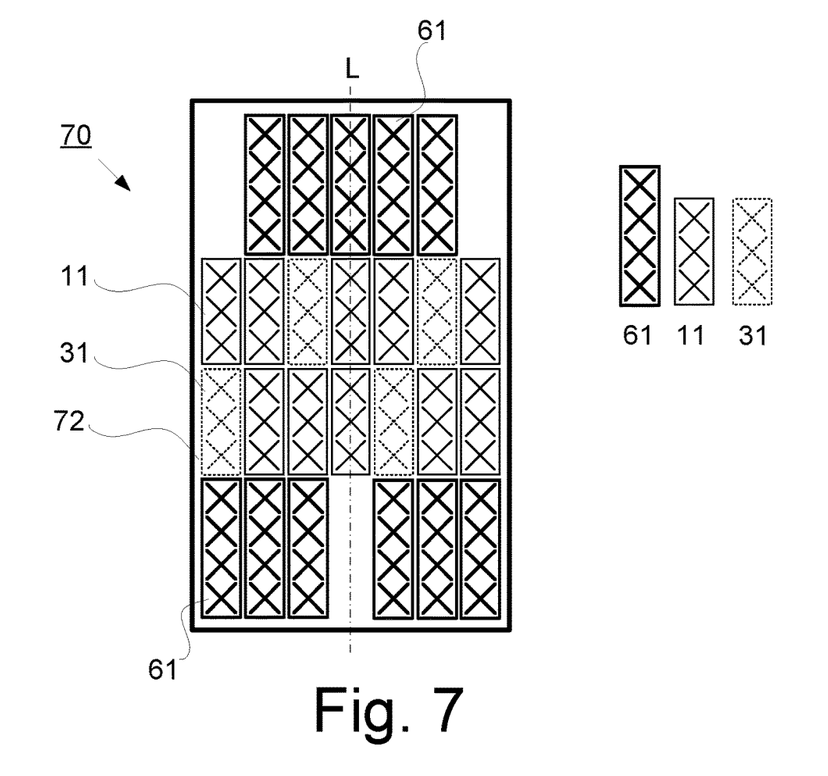
FIG. 7 illustrates an example embodiment of an AAS with three types of subarrays arranged on an antenna surface.

Using subarrays with any combination of the above. One example is illustrated in FIG. 7.

FIG. 1 illustrates an active antenna system AAS 10 with an array of vertical subarrays 11, all identical in order to optimize the array aperture and number of radio chains with respect to the desired primary coverage angular range. Each subarray 11 comprises multiple radiating elements 1 and the subarrays are arranged on an antenna surface 12.

FIG. 2 illustrates a node 20 with an AAS 10, as illustrated in FIG. 1, placed on a mast 15 at a site together with a schematical view of a vertical cut of a radiation pattern 22 for the AAS 10, illustrated by solid lines, as well as a radiation pattern 21 for one subarray 11, illustrated by dashed lines. Dotted lines indicate angular interval in elevation where the subarray pattern low gain region 23 impedes the coverage of the AAS 10.

To compensate for the path loss the antenna gain should be optimized to the regions close to the cell border, i.e. a primary coverage angular range 24, while closer to the site the path loss is significantly less, and the same link budget can be kept with a significantly less antenna gain. The latter can be seen as a secondary coverage angular range 25 in the vertical plane, where a reasonable antenna gain must be ensured.

Different embodiments will be described in connection to FIGS. 3-7, and illustrative examples will be described in connection to FIGS. 8a-16b. In general, the disclosure relates to an active antenna system, AAS, for controlling coverage in a telecommunication network, the AAS comprising a plurality of subarrays each having multiple radiating elements. The AAS is configured to provide coverage in a coverage angular range and the plurality of subarrays comprises at least two types of subarrays. The at least two types of subarrays comprises a first type of subarray with a first radiation pattern having at least a first angular region with gain below a first threshold value, and a second type of subarray with a second radiation pattern having at least a second angular region with gain below a second threshold value, wherein the second radiation pattern deviates from the first radiation pattern and the first angular region in the first radiation pattern differs from the second angular region in the second radiation pattern. This also includes the situation when identical subarrays are used, and a part of the subarrays are subject to electrical tilt (e.g. generated remotely) as described in connection with FIG. 3.

The angular range is in this disclosure expressed in a spherical angle θ with θ=0 in the z direction and 180° in the −z direction (see FIG. 2). The coverage angular range is part of the angular range 0-180 degrees, and may for instance be less than 120 degrees within the angular range of 60-180 degrees. The examples are illustrated for elevation angle, but it is possible to implement the same functionality in azimuth.

According to some embodiments, the first angular region overlaps with the second angular region which will improve the coverage in the secondary angular coverage range but not eliminate the bad coverage in the region.

According to some embodiments, the first radiation pattern has a gain above the first threshold value in the second angular region. Thereby reducing the influence of the low gain region of the second radiation pattern.

According to some embodiments, the second radiation pattern has a gain above the second threshold value in the first angular region. Thereby eliminating the influence of the low gain region of the first radiation pattern.

According to some embodiments, each angular region is in a direction including a null in the respective radiation pattern of the subarrays.

The wording "type of sub array" should not exclude the option when identical subarrays are used in the AAS, as long as the different types of subarray create different radiation pattern during operation. This may be achieved by mechanical tilting of the subarray when mounted on the antenna surface or when wherein the first type of subarray has different phase taper and/or amplitude taper compared to the second type of subarray to create different radiation patterns.

Phase taper will create "electrical tilt" of the radiation pattern generated from a subarray. Amplitude taper (either by itself or in combination with phase taper), will create different radiation patterns with different angular regions where the gain is below a certain threshold.

According to some embodiments, each threshold value in the respective angular region is less than one hundredths, $\frac{1}{100}$, of maximal gain of each radiation pattern. In some embodiments, each threshold value may be less than one thousands $\frac{1}{1000}$ of maximal gain. Each threshold value may be individually selected and depends on different conditions. One example of such conditions may be service level in the telecommunication system.

According to some embodiments, the first threshold value and the second threshold value are identical, or at least substantially identical.

According to some embodiments, a combined radiation pattern created by the at least two types of subarrays has a maximal gain envelope pattern above a gain threshold value for all angles within the coverage angular range. The gain threshold value is preferably −30 dB, or higher, relative maximum gain value within the angular coverage range for the envelope pattern. The gain threshold value may also be expressed as a percentage of maximum gain value for the envelope pattern within the angular range, e.g. if the maximum gain value is 20 dB, the gain threshold value may be 0.1% of the maximum value, i.e. −10 dB.

When controlling the coverage in a vertical direction (elevation), each type of subarray has a height, within which height the multiple radiating elements are arranged. According to some embodiments, the first type of subarray has a first height and the second type of subarray has a second height, and the first height differs compared to the second height. According to some embodiments, the first height is the same as the second height.

Each subarray comprises multiple radiating elements and adjacently arranged radiating elements within each subarray have an element separation. According to some embodiments, the element separation of the first type of subarray differs compared to the element separation of the second type of subarray. According to some embodiments, the element separation of the first type is equal to the element separation of the second type of subarray, but the tilt angle and/or the number of radiating elements may differ to create subarrays with different radiation patterns. Element separation may be exemplified as a center-to-center distance.

According to some embodiments, the first type of subarray comprises a first number, N, of radiating elements, and the second type of subarray comprises a second number, M, of radiating elements. According to some embodiments, the first number, N, of radiating elements is equal to the second number, M, of radiating elements. According to some embodiments, the first number, N, of radiating elements differs compared to the second number, M, of radiating elements.

Any type of suitable radiating elements may be implemented in each subarray, and according to some embodiments each radiating element is a dual polarized radiating element.

The plurality of subarrays may be arranged over the antenna surface in any suitable way. According to some embodiments, the first type of subarray and/or the second type of subarray are non-symmetrically arranged over the antenna surface in relation to a symmetry line, L. According to some embodiments, the first type of subarray and/or the second type of subarray are symmetrically arranged over the antenna surface in relation to a symmetry line, L. This is exemplified in the example embodiments below.

These aspects will be described in connection to the following figures.

Figure 3:
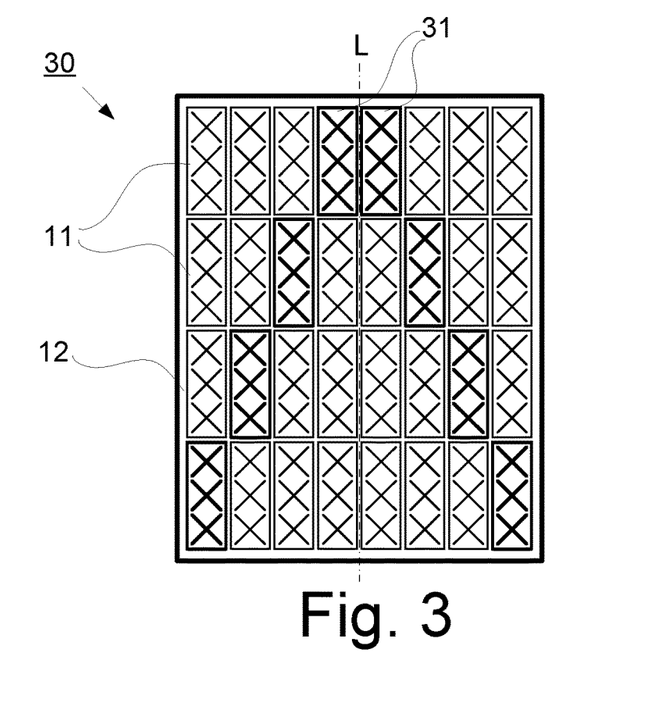
FIG. 3 is an example embodiment of an AAS with subarrays having different electrical down tilt.

FIG. 3 is an example embodiment of an active antenna system, AAS, 30 comprising an 8×4 array antenna with subarrays 11, 31 arranged on an antenna surface 12 and having different down tilt. As mentioned above, the AAS comprises subarrays with same physical properties, i.e. same size (height) and same number of radiating elements, 1×3. In this example two types of subarrays are illustrated: a first type of subarray 11 corresponding to the subarray disclosed in connection with FIG. 1 and a second type of subarrays 31 is obtained by configuring some of the subarrays to have different phase taper (sub-array tilt), and/or amplitude taper compared to the first type of subarray 11. In this example the first type of subarrays and the second type of subarrays are symmetrically arranged over the antenna surface 12 in relation to a vertical symmetry line, L.

Figure 4:
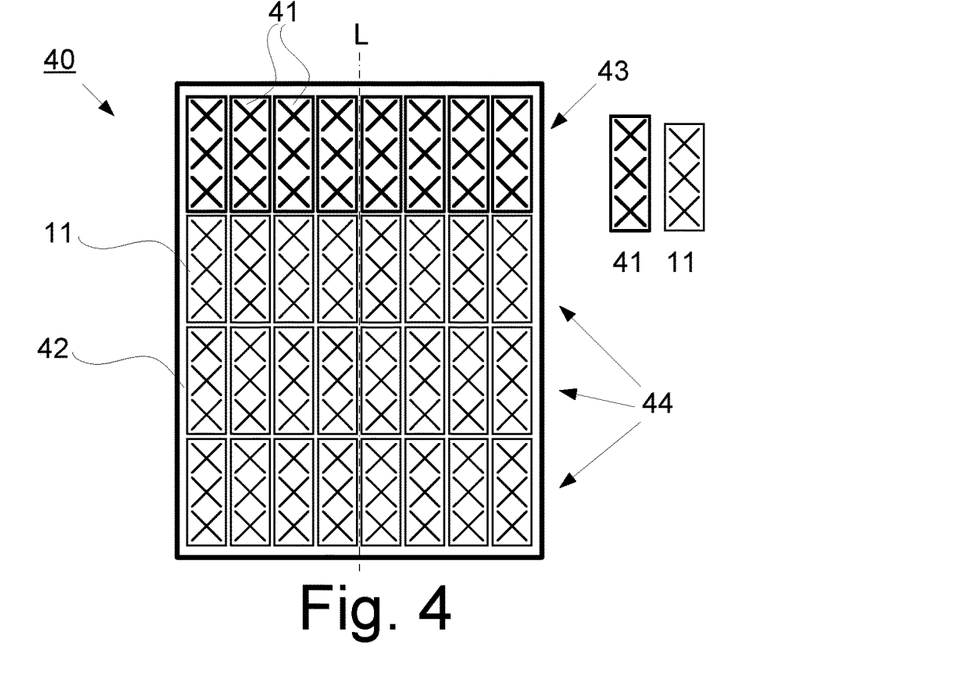
FIG. 4 is a first example embodiment of an AAS with subarrays having different size (height) by having different element separations.

FIG. 4 is a first example embodiment of an AAS 40 comprising an 8×4 array antenna with subarrays 11, 41 arranged on an antenna surface 42 and having the same number of radiating elements but different sizes (heights). In this example two types of subarrays are illustrated: a first type of subarray 11 corresponding to the subarray disclosed in connection with FIG. 1 and a second type of subarrays 41 with different size (height) and thus having different element separation compared to the first type of subarrays 11. The difference in height between the first type of subarray and the second type of subarray is illustrated on the right side of the AAS. In this example the second type of subarrays are arranged in an upper row 43 of subarrays in the array antenna and the first type of subarrays are arranged in the lower three rows 44 of the array antenna. Furthermore, the first type of subarrays 11 and the second type of subarrays 41 are symmetrically arranged over the antenna surface 42 in relation to a vertical symmetry line, L.

Figure 5A:
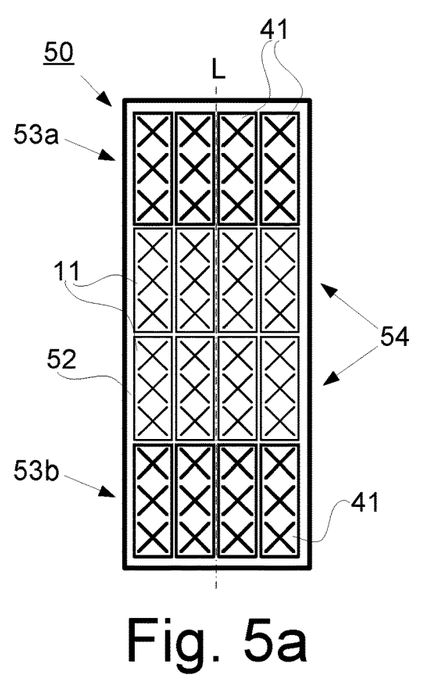
FIGS. 5a and 5b respectively illustrate a second and a third example embodiment of an AAS with subarrays having different size (height) by having different element separations.
Figure 5B:
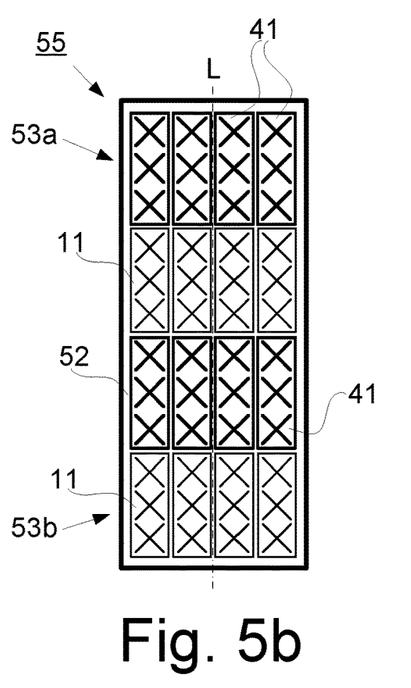

FIGS. 5a and 5b respectively illustrate a second and a third example embodiment of an AAS with subarrays having different size (height) by having different element separations.

The second example of an AAS 50 comprises a 4×4 array antenna with subarrays 11, 41 arranged on an antenna surface 52 and having the same number of radiating elements but different sizes (heights) as described in connection with FIG. 4. In this example the second type of subarrays are arranged in an upper row 53a and a lower row 53b of subarrays in the array antenna and the first type of subarrays are arranged in the middle rows 54 of the array antenna. Furthermore, the first type of subarrays 11 and the second type of subarrays 41 are symmetrically arranged over the antenna surface 52 in relation to a vertical symmetry line, L.

The third example of an AAS 55 comprises a 4×4 array antenna with subarrays 11, 41 arranged on the antenna surface 52 and having the same number of radiating elements but different sizes (heights) as described in connection with FIG. 4. In this example the second type of subarrays are arranged in every second row starting with the upper row 53a of subarrays in the array antenna and the first type of subarrays are arranged in every second row starting with the lower row 53b of the array antenna. Furthermore, the first type of subarrays 11 and the second type of subarrays 41 are symmetrically arranged over the antenna surface 52 in relation to a vertical symmetry line, L.

Figure 6:
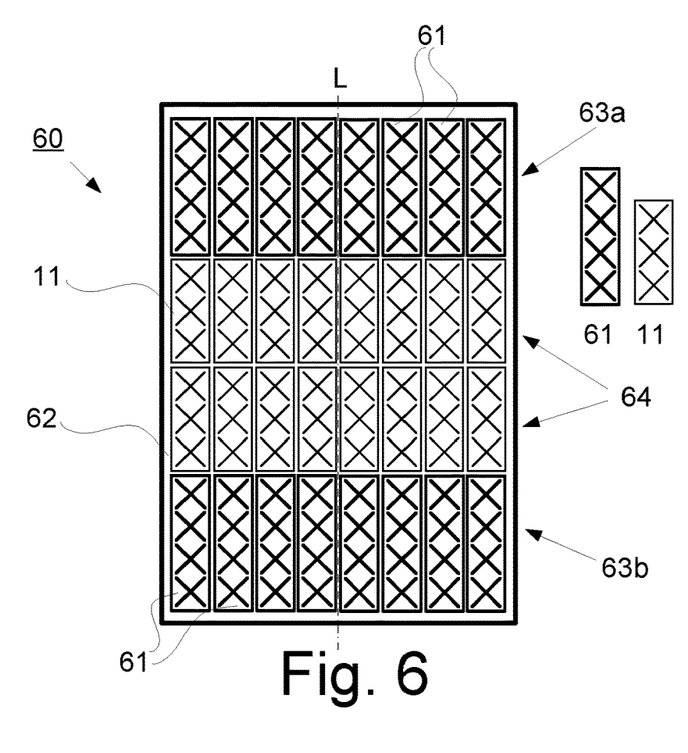
FIG. 6 illustrates an example embodiment of an AAS with subarrays having different size (height) and number of radiating elements.

FIG. 6 illustrates an example embodiment of an AAS 60 with subarrays 11, 61 arranged on an antenna surface 62 and having different size (height) and number of radiating elements. In this example two types of subarrays are illustrated: a first type of subarray 11 corresponding to the subarray disclosed in connection with FIG. 1 having three radiating elements, and a second type of subarrays 61 with four radiating elements and thus different size (height). The element separation for the first type of subarray and the second type of subarray is in this example the same. The difference in height and number of radiating elements between the first type of subarray 11 and the second type of subarray 61 is illustrated on the right side of the AAS 60. In this example the second type of subarrays 61 are arranged in an upper row 63a and a lower row 63b of subarrays in the array antenna and the first type of subarrays 11 are arranged in the middle rows 64 of the array antenna. Furthermore, the first type of subarrays 11 and the second type of subarrays 41 are symmetrically arranged over the antenna surface 52 in relation to a vertical symmetry line, L.

FIG. 7 illustrates an example embodiment of an AAS 70 with three types of subarrays 11, 31, 61 arranged on an antenna surface 72. In this example three types of subarrays are illustrated: a first type of subarray 11 corresponding to the subarray disclosed in connection with FIG. 1, a second type of subarrays 31 corresponding to the subarray disclosed in connection with FIG. 3, and a third type of subarrays 61 corresponding to the subarray disclosed in connection with figure. The difference in height and number of radiating elements of the first type of subarray 11, the second type of subarray 31, and the third type of subarray 61 is illustrated on the right side of the AAS 70. In this example the first type of subarrays 11 and the second type of subarrays 31 are non-symmetrically arranged in relation to a vertical symmetry line, L, and the third type of subarrays are symmetrically arranged in relation to the vertical symmetry line, L.

Consider the antenna arrays of sub-arrays in FIGS. 3-6. Assuming the antenna arrays consists of N subarrays in total where one set N1 of the sub-arrays have different sub-array patterns compared to the sub-array patterns of the second set N2 of sub-arrays. The radiation properties of the array antenna can then be written as:

$$\vec{E}(\theta, \varphi) = \vec{g}_1(\theta, \varphi) \cdot AF_1(\theta, \varphi) + \vec{g}_2(\theta, \varphi) \cdot AF_2(\theta, \varphi) \quad (2)$$

where $\vec{g}_1(\theta, \varphi)$=sub-array antenna radiation pattern of first set of sub-arrays $\vec{g}_2(\theta, \varphi)$=sub-array antenna radiation pattern of second set of sub-arrays and $$AF_1(\theta, \varphi) = \sum_{m=1}^{N_1} I_m \cdot e^{jk \cdot r_m}$$

$$AF_2(\theta, \varphi) = \sum_{k=1+N_1}^{N_1+N_2} I_k \cdot e^{jk \cdot r_k}$$

where $I_n$=excitation coefficient of n'th antenna sub-array (beamforming weight)

$r_n$=position of the n'th sub-array $N_1+N_2=N$

Equation (1) shows the radiation properties for the case of having one set of sub-arrays having the same sub-array patterns. The equation shows that $\vec{E}(\theta, \varphi)$ will become zero for angles $(\theta, \varphi)$ where the sub-array pattern $\vec{g}(\theta, \varphi)$ have nulls independently of the excitation coefficients $I_n$.

However, equation (2) shows that as long as $\vec{g}_1(\theta, \varphi)$ and $\vec{g}_2(\theta, \varphi)$ do not have sub-array radiation patterns with nulls in the same direction, the excitation coefficients $I_n$ can for each $(\theta, \varphi)$ always be selected so that there will be no nulls in $\vec{E}(\theta, \varphi)$.

In more general: Assuming an antenna array consisting of in total N subarrays that are divided in P types of sub-arrays having different sub-array patterns, the radiation properties of the array antenna can then be written as:

$$\vec{E}(\theta, \varphi) \approx \sum_{p=1}^{P} \vec{g}_p(\theta, \varphi) \cdot AF_p(\theta, \varphi) \quad (3)$$

where $\vec{g}_p(\theta, \varphi)$=sub-array antenna radiation pattern of the P types of sub-arrays and $$AF_p(\theta, \varphi) = \sum_{m=1}^{N_p} I_{m,p} \cdot e^{jk \cdot r_{m,p}}$$

where $I_{m,p}$=excitation coefficient of (m,p)'th antenna sub-array (beamforming weight)

$r_{m,p}$=position of the (m,p)'th sub-array $N_1+N_2+\ldots+N_P=N$

In the following, a number of examples will be described.

Figure 8A:
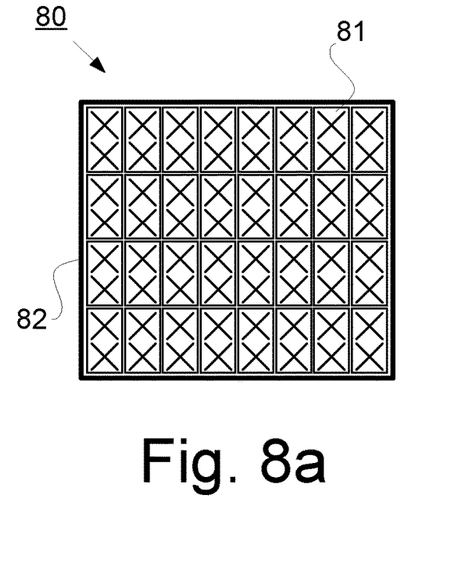
FIG. 8a illustrates an 8×4 antenna array with the same type of subarrays.
Figure 9A:
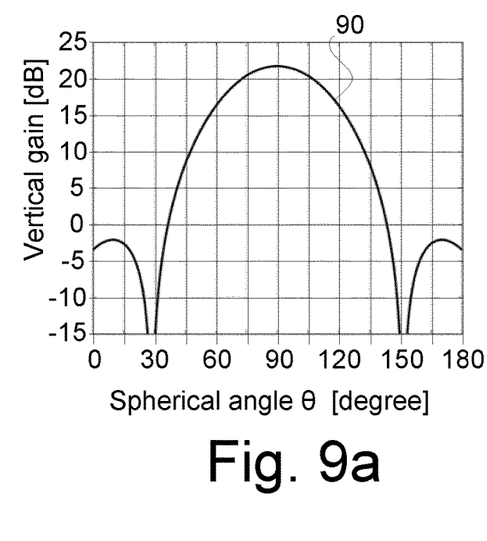
Figure 9B:
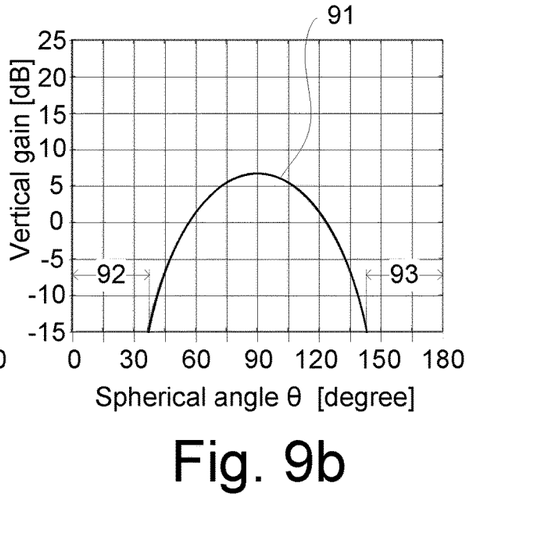

As a first example, FIG. 8a illustrates an AAS 80 comprising an 8×4 antenna array with the same type of subarrays, each subarray 81 having 1×2 radiating elements arranged on an antenna surface 82. FIGS. 9a illustrates maximal gain envelope pattern 90 in the vertical plane for the antenna array over an angular range 0°<θ<180°, and FIG. 9b illustrates the subarray radiation pattern 91 of one of the subarrays in FIG. 8a. The Maximal gain envelope pattern 90 is the envelope pattern obtained when for each (θ, φ) the excitation coefficients $I_n$ is selected for maximal gain in the direction (θ, φ) As seen from FIG. 9a, the maximal gain envelope has nulls around 30° and 150°.

For the subarray 81, the radiation pattern 91 have two low gain regions 92 and 93, i.e. angular regions with gain below a first threshold value, e.g. −15 dB, within an angular coverage range of 0-180 degrees.

Figure 8B:
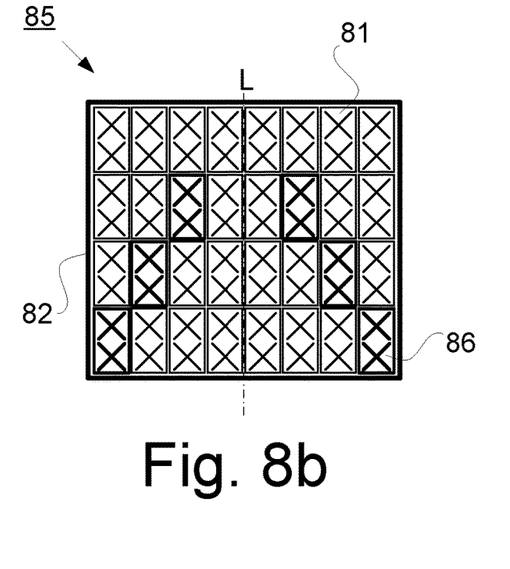
FIG. 8b illustrates an 8×4 antenna array with two types of subarrays with different electrical down tilt.

FIG. 8b illustrates an AAS 85 comprising an 8×4 antenna array with two types of subarrays 81, 86 with different down tilt, each having 1×2 radiating elements. The first type of subarray 81 corresponds to the subarray described in connection with FIG. 8a with a down tilt and the second type of subarray 86 has a different down tilt compared to the first type of subarray, as described in connection with FIG. 3.

Figure 10A:
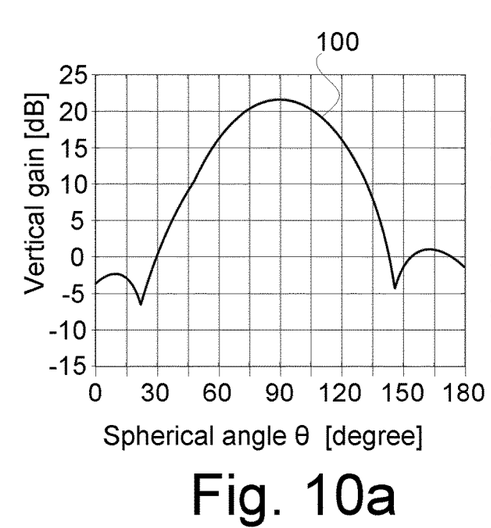
FIGS. 10a and 10b respectively illustrate maximal vertical gain envelope pattern for the antenna array, and the subarray radiation patterns of the two types of subarrays in FIG. 8b.
Figure 10B:
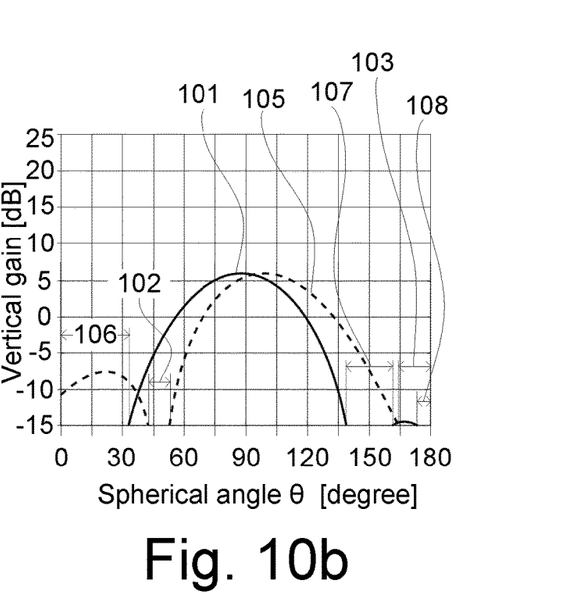

FIG. 10a shows maximal gain envelope pattern 100 in the vertical plane of the antenna array for the case of having two types of sub-arrays as illustrated in FIG. 8b. In this example there are twenty six subarrays are of the first type 81 with a vertical down tilt of −2.8 degrees, and six subarrays are of a second type 86 with a vertical down tilt of +12.2 degrees and they are symmetrically arranged in relation to a vertical symmetry line, L. The corresponding subarray patterns are shown in FIG. 10b. The radiation pattern 101 of the first type of subarray 81 is illustrated by a solid line, and the radiation pattern 105 of the second type of subarray 86 is illustrated by a dashed line. Tilt per subarray is in this case selected to give zero degree tilt in average over all subarrays.

For the tilted subarray 81, the radiation pattern 101 have two low gain regions 102 and 103, i.e. angular regions with gain below a first threshold value, e.g. −15 dB, within an angular coverage range of 0-180 degrees. For the tilted subarray 86, the radiation pattern 105 have three low gain regions 106, 107 and 108, i.e. angular regions with gain below a first threshold value, e.g. −15 dB, within an angular coverage range of 0-180 degrees. Note that angular regions 102, 103, 106 and 107 are non-overlapping, while angular regions 103 and 108 are overlapping.

When comparing FIG. 10a with FIG. 9a, a significant improvement of the max gain envelope around 30° and 150° can be seen with the envelope not exhibiting any nulls.

Figure 11A:
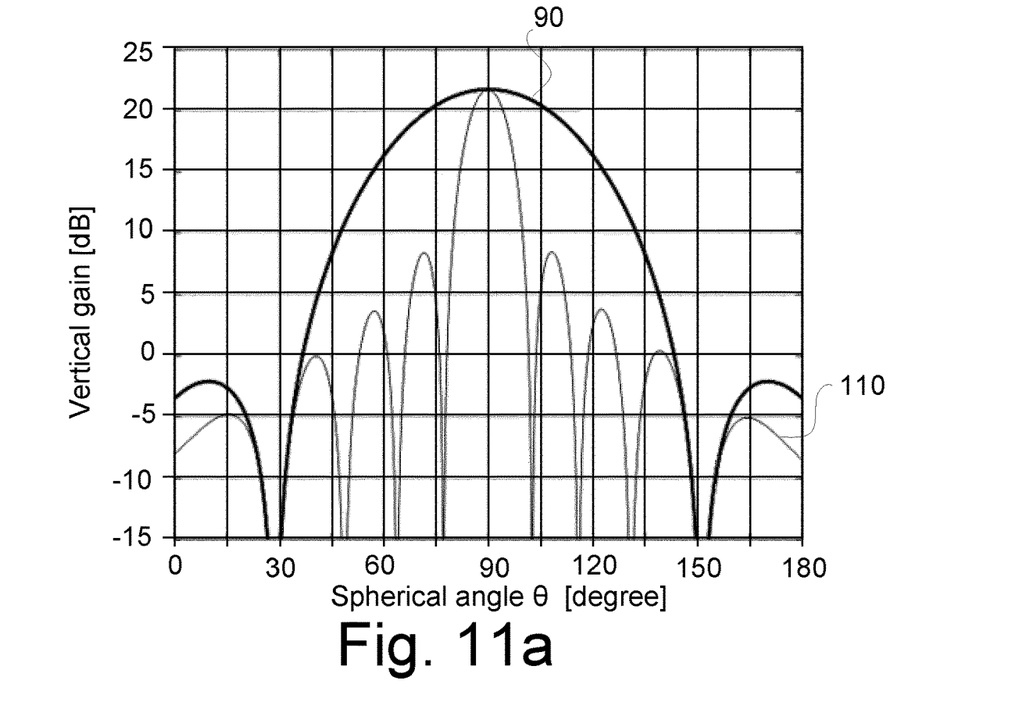
FIGS. 11a and 11b illustrate a beam example for maximal possible gain at spherical angle 151 degrees for the antenna in FIG. 8a and FIG. 8b, respectively.
Figure 11B:
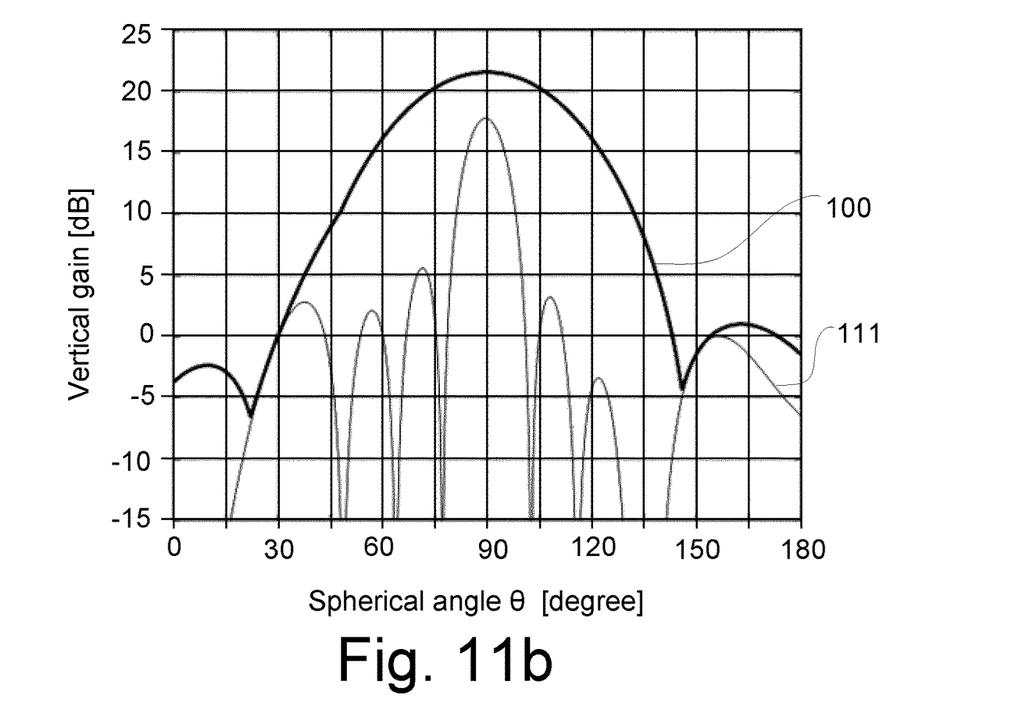

FIGS. 11a and 11b illustrate a beam example for maximum possible gain at spherical angle 151 degrees for the antenna in FIG. 8a and FIG. 8b, respectively. The array factor, AF, is in both cases, illustrated in FIG. 11a and FIG. 11b, set to give maximum possible gain at theta θ=151° The impact of not all subarrays having the same tilt for a narrow beam generated using the entire array becomes obvious from FIGS. 11a and 11b where a beam is designed to have maximum gain at 151 degrees. FIG. 11a shows the result where all subarrays are identical, as in FIG. 8a. As the subarrays have a null, or at least very low gain at 151 degrees, the narrow beam 110 generated by the array factor, AF, in combination with element patterns will not have any gain in that direction. FIG. 11a shows that the gain for the narrow beam coincide with the maximum gain envelope pattern around 151 degrees. The narrow beam in FIG. 11a may look a bit strange as it appears as if the beam actually is pointing at approximately 0 degrees and not 151 degrees. This is because the beam is formed via four subarrays in elevation and the distance between subarrays make a grating lobe appear at 0 degrees when steering the beam towards an angle of 151 degrees.

FIG. 11b shows that the gain for the narrow beam 111 coincides with the envelope pattern around 151 degrees and the performance has improved around 151 degrees.

Figure 12A:
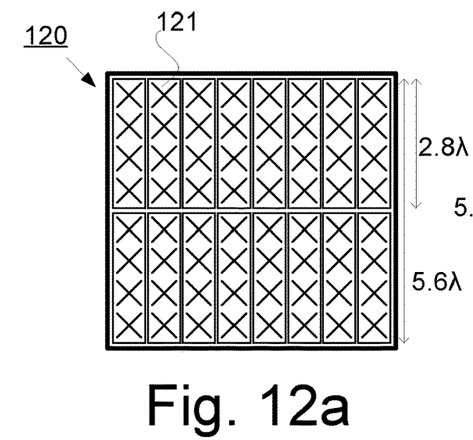
FIG. 12a illustrates an 8×2 antenna array with the same type of subarrays.

As a second example of an example embodiment consider an AAS 120 comprising an 8×2 antenna array consisting of 1×4 element sub-arrays 121 shown in FIG. 12*a*. In this case the sub-array height is 2.8λ and the element separation is 0.7λ (center to center). The total height of the antenna surface of the array antenna is thus 5.6λ.

Figure 13A:
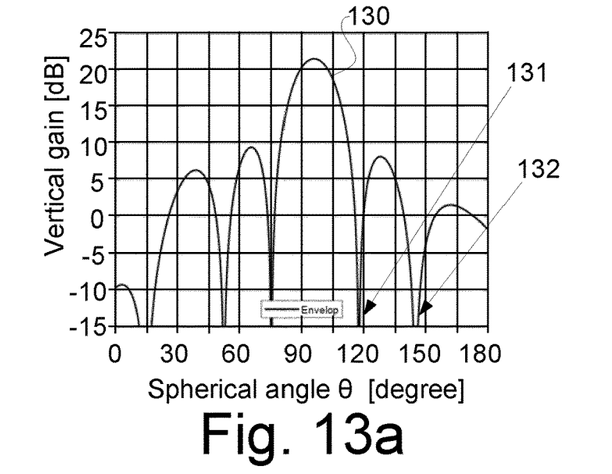
Figure 13B:
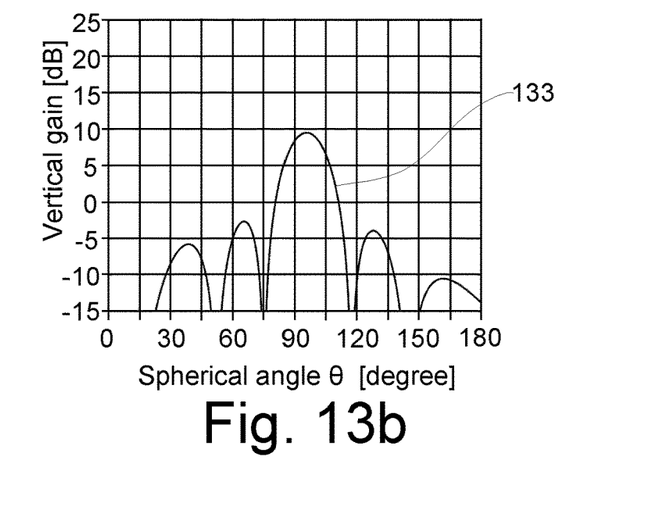

FIG. 13*a* illustrates maximal vertical gain envelope pattern 130 of the antenna array for the case of having one type of sub-array 121 according to FIG. 12*a*. FIG. 13*b* illustrates the subarray radiation pattern 133 of one of subarrays 121 in FIG. 12*a*. As seen from FIG. 13*a* the maximal gain envelope of the antenna array has two nulls below the horizon, θ=90°, at around 115°, as indicated by reference numeral 131, and 145°, as indicated by reference numeral 132.

Figure 12B:
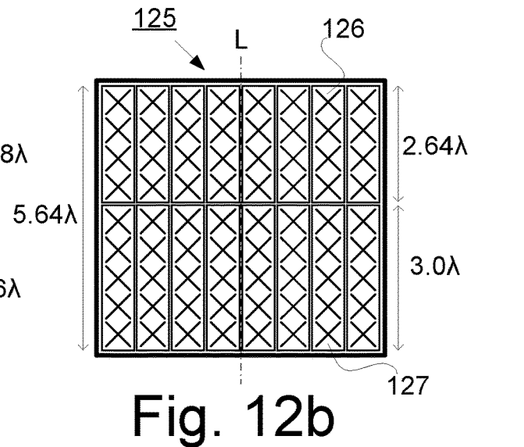
FIG. 12b illustrates an 8×2 antenna array with two types of subarrays with different number of radiating elements and element separation.

FIG. 12*b* illustrates an AAS 125 comprising an 8×2 antenna array with two types of subarrays with different number of radiating elements and element separation. In this example, eight subarrays of a first type 126 with a height of 2.64λ consisting of four radiating elements with an element separation of 0.66λ and eight subarrays of a second type 127 with a height of 3.0λ consisting of five radiating elements with an element separation of 0.60λ. I.e. the total height of the array antenna is 5.64λ.

Figure 14A:
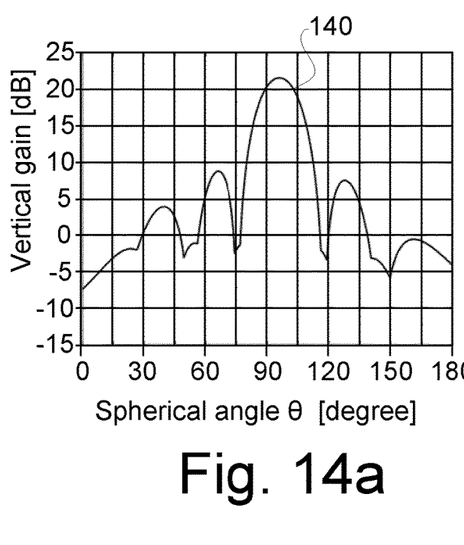
FIGS. 14a and 14b respectively illustrate maximal vertical gain envelope pattern for the antenna array, and the subarray radiation patterns of the two types of subarrays in FIG. 12b.
Figure 14B:
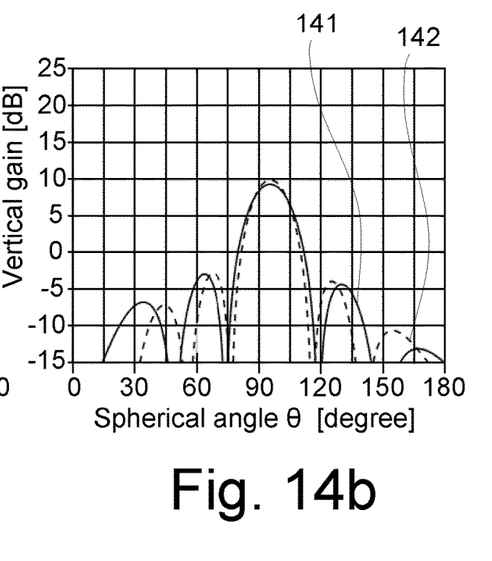

FIG. 14*a* illustrates maximal vertical gain envelope pattern 140 of the antenna array for the configuration illustrated in FIG. 12*b*, and the corresponding sub-array patterns 141 and 142, respectively, are shown in FIG. 14*b*. The radiation pattern 141 of the first type of subarray 126 is illustrated by a solid line, and the radiation pattern 142 of the second type of subarray 127 is illustrated by a dashed line.

When comparing FIG. 14*a* with FIG. 13*a* it is seen that the nulls below the horizon around 115° and 145° are now significantly improved.

If more null-filling is desired this can be accomplished by additionally increasing the difference between the subarray patterns. However, this has to be balanced with the performance of the gain envelope within the primary coverage angular range.

Figure 14C:
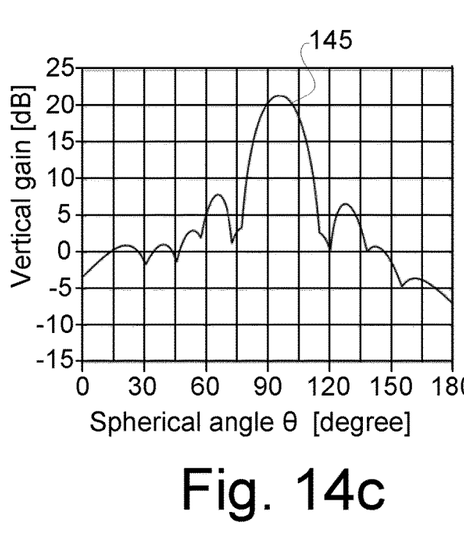
FIGS. 14c and 14d respectively illustrate maximal vertical gain envelope pattern for an alternative antenna array, and the subarray radiation patterns of the two types of subarrays in the alternative antenna array.

FIG. 14*c* illustrates maximal vertical gain envelope pattern 145 of an alternative configuration of the antenna array having two types of subarrays as described in connection with FIG. 12*b*. In this example there are eight subarrays of a first type with a height of 2.48λ consisting of 4 radiating elements with an element separation of 0.62λ and eight subarrays of a second type with a height of 3.10λ, consisting of 5 radiating elements with an element separation of 0.62λ. I.e. the total height of the array antenna is 5.58λ.

Figure 14D:
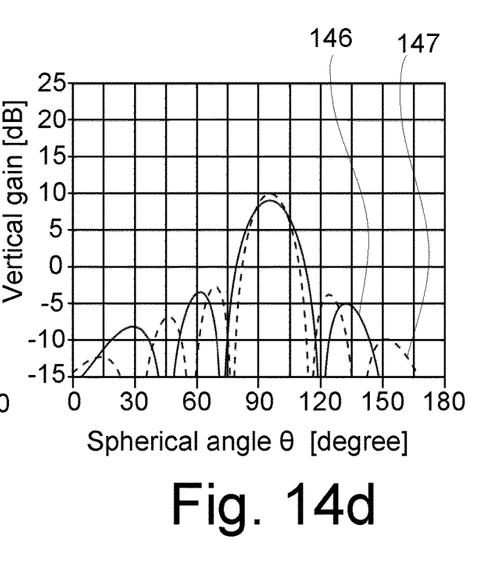

The corresponding sub-array patterns 146 and 147, respectively, are shown in FIG. 14*d*. The radiation pattern 146 of the first type of subarray is illustrated by a solid line, and the radiation pattern 147 of the second type of subarray is illustrated by a dashed line.

A third example of an example embodiment also relates to the AAS 120 comprising an 8×2 antenna array consisting of 1×4 element sub-arrays shown in FIG. 12*a*. However, in this example the size of and the number of radiating elements in the subarrays are kept the same as in FIG. 12*a*, but there are two types of subarrays with different electrical down tilts.

Figure 15:
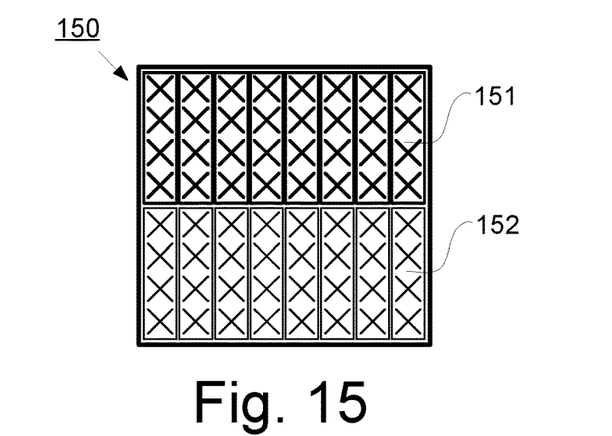
FIG. 15 illustrates an 8×2 antenna array with two types of subarrays with different down tilt.
Figure 16A:
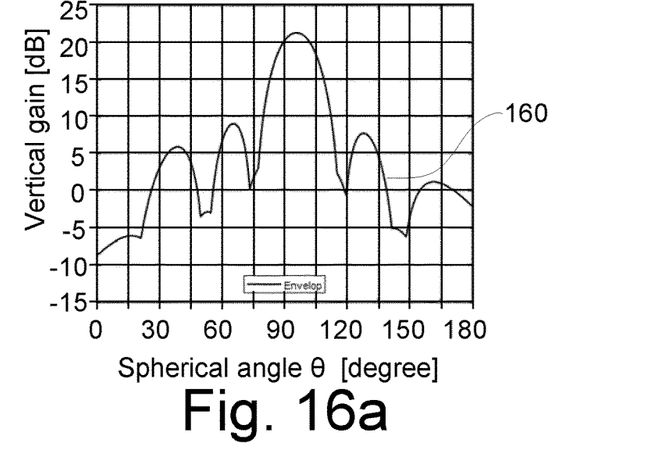
FIGS. 16a and 16b respectively illustrate maximal vertical gain envelope pattern for the antenna array, and the subarray radiation pattern of the two types of subarray in FIG. 15.
Figure 16B:
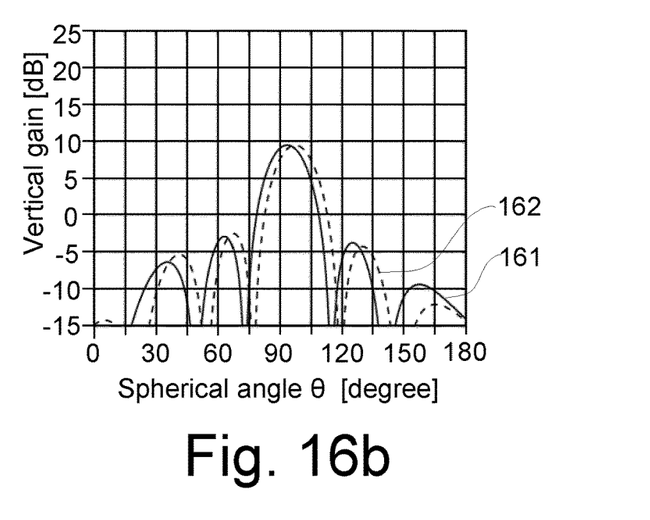

FIG. 15 illustrates an AAS 150 comprising eight subarrays of a first type 151 with 4° electrical down tilt and eight subarrays of a second type 152 with 8° electrical down tilt. FIG. 16*a* shows maximal vertical gain envelope pattern 160 of the antenna array in FIG. 15, and FIG. 16*b* shows the corresponding sub-array patterns 161 and 162, respectively. The radiation pattern 161 of the first type of subarray 151 is illustrated by a solid line, and the radiation pattern 162 of the second type of subarray 152 is illustrated by a dashed line.

When comparing FIG. 16*a* with FIG. 13*a* it is seen that the nulls below the horizon around 115° and 145° are now significantly improved.

More null-filling can be accomplished by increasing the difference between the sub-array down tilts. However, this must be balanced with the performance of the gain envelope within the primary coverage angular range.

The present disclosure also relates to a node in a telecommunication network comprising an active antenna system, AAS, according to any combination of the example embodiments described in connection with FIGS. 3-16.

Figure 17:
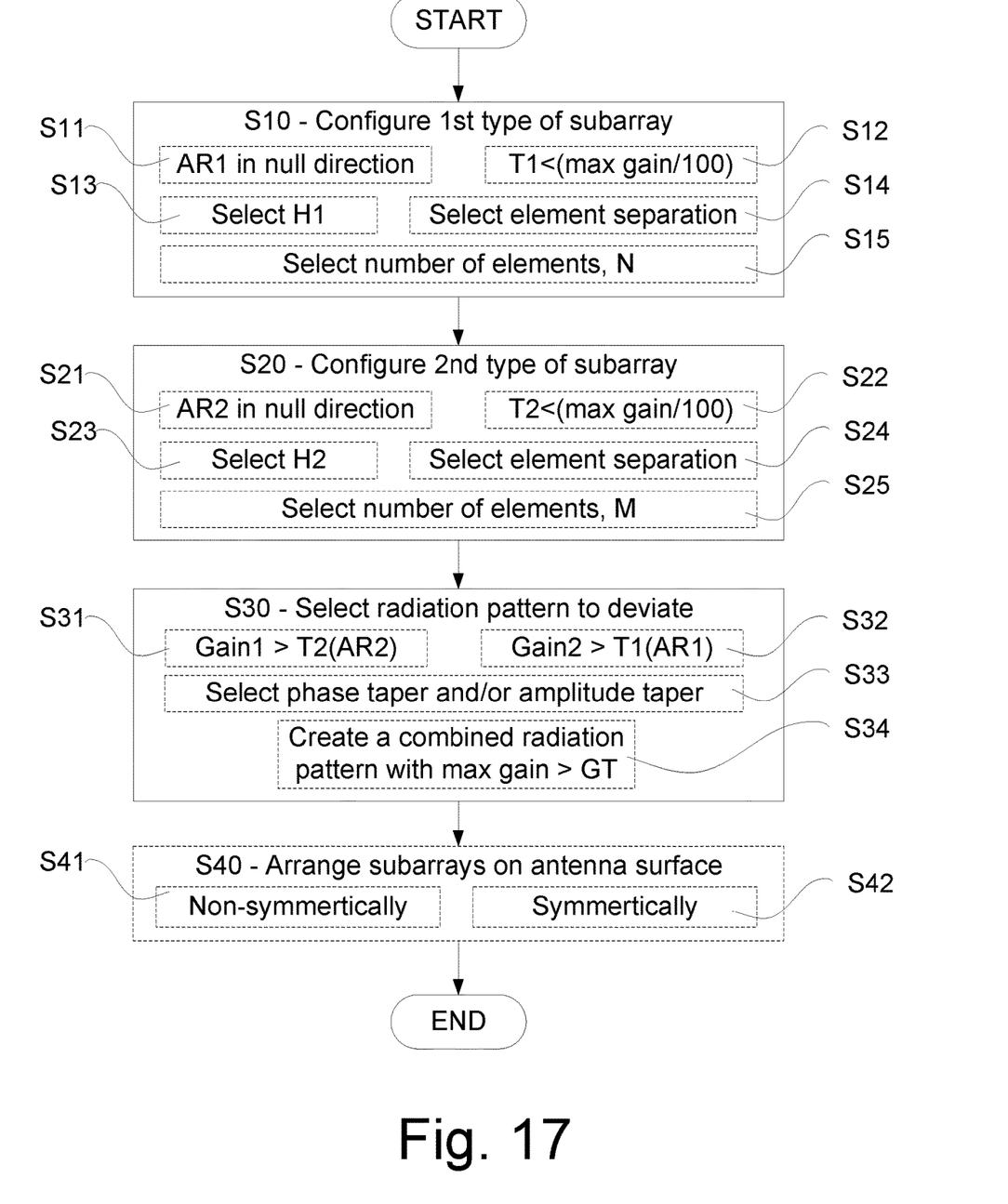
FIG. 17 is a flowchart illustrating embodiments of method steps.

FIG. 17 is a flowchart illustrating embodiments of method steps for controlling coverage in a telecommunication network using nodes with an active antenna system, AAS, comprising a plurality of subarrays each having multiple radiating elements. The AAS is configured to provide coverage in a coverage angular range and the plurality of subarrays comprises at least two types of subarrays. The method comprising: configuring S10 a first type of subarray with a first radiation pattern having at least a first angular region with gain below a first threshold value, configuring S20 a second type of subarray with a second radiation pattern having at least a second angular region with gain below a second threshold value, and selecting S30 the second radiation pattern to deviate from the first radiation pattern to ensure that the first angular region in the first radiation pattern differs from the second angular region in the second radiation pattern.

The method may also comprise arranging the subarrays on an antenna surface S40. According to some aspects, the method further comprises arranging S41 the first type of subarray and/or the second type of subarray non-symmetrically over the antenna surface in relation to a symmetry line, L. According to some embodiments, the method further comprises arranging S42 the first type of subarray and/or the second type of subarray symmetrically over the antenna surface in relation to a symmetry line, L.

According to some embodiments, the method further comprises configuring S11, S21 each angular region to be in a direction including a null in the respective radiation pattern.

According to some embodiments, the method further comprises selecting S12, S22 each threshold value to be less than one hundredths of maximal gain of each radiation pattern.

According to some embodiments, the first threshold value and the second threshold value are selected to be identical, or at least substantially identical.

Each type of subarray has a height, within which height the multiple radiating elements are arranged. According to some embodiments, the method further comprises configuring S13 the first type of subarray to have a first height H1 and configuring S23 the second type of subarray to have a second height H2, and the first height differs compared to the second height, H1≠H2.

Adjacently arranged radiating elements within each subarray have an element separation. According to some embodiments, the method further comprises configuring S14, S24 the element separation of the first type of subarray to differ from the element separation of the second type of subarray.

According to some embodiments, the method further comprises selecting S15 the first type of subarray to comprise a first number $N_1$ of radiating elements, and selecting S25 the second type of subarray to comprise a second number $N_2$ of radiating elements. The first number $N_1$ of radiating elements may be equal to the second number $N_2$ of radiating elements, or the first number $N_1$ of radiating elements may differ from the second number $N_2$ of radiating elements.

According to some embodiments, the method further comprises selecting each radiating element to be a dual polarized radiating element.

According to some embodiments, selecting S30 radiation patterns to deviate further comprising selecting S31 the first radiation pattern to have a gain above the first threshold value in the second angular region.

According to some embodiments, selecting S30 radiation patterns to deviate further comprising selecting S32 the second radiation pattern to have a gain above the second threshold value in the first angular region.

According to some embodiments, selecting S30 radiation patterns to deviate further comprising selecting S33 the first type of subarray to have different phase taper and/or amplitude taper compared to the second type of subarray to create different radiation patterns.

According to some embodiments, selecting S30 radiation patterns to deviate further comprising selecting S34 the radiation pattern of the at least two types of subarrays to create a combined radiation pattern with maximal gain envelope pattern above a gain threshold value for all angles within the coverage angular range.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus and systems. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A node in a telecommunication system comprising an active antenna system, AAS, for controlling coverage in the telecommunication network, the AAS comprising a plurality of subarrays each having multiple radiating elements, the plurality of subarrays comprising at least two types of subarrays comprising:
   a first type of subarray with a first radiation pattern having at least a first angular region with gain below a first threshold value, and
   a second type of subarray with a second radiation pattern having at least a second angular region with gain below a second threshold value,
   wherein the second radiation pattern deviates from the first radiation pattern and the first angular region in the first radiation pattern differs from the second angular region in the second radiation pattern.

2. The node according to claim 1, wherein the first radiation pattern has a gain above the first threshold value in the second angular region.

3. The node according to claim 1, wherein the second radiation pattern has a gain above the second threshold value in the first angular region.

4. The node according to claim 1, wherein the first type of subarray has a different phase taper and/or a different amplitude taper compared to the second type of subarray.

5. The node according to claim 1, wherein each angular region is in a direction including a null in the respective radiation pattern.

6. The node according to claim 1, wherein each threshold value is less than one hundredths of maximal gain of each radiation pattern.

7. The node according to claim 1, wherein the first threshold value and the second threshold value are substantially identical.

8. The node according to claim 1, wherein a combined radiation pattern created by the at least two types of subarrays has a maximal gain envelope pattern above a gain threshold value for all angles within a coverage angular range of the AAS.

9. The node according to claim 1, wherein each type of subarray has a height, within which height the multiple radiating elements are arranged, wherein the first type of subarray has a first height and the second type of subarray has a second height, and the first height differs compared to the second height.

10. The node according to claim 1, wherein adjacently arranged radiating elements within a subarray have an element separation, and the element separation of the first type of subarray differs compared to the element separation of the second type of subarray.

11. The node according to claim 1, wherein the first type of subarray comprises a first number (N1) of radiating elements, and the second type of subarray comprises a second number (N2) of radiating elements.

12. The node according to claim 11, wherein the first number
   (N1) of radiating elements is equal to the second number
       (N2) of radiating elements.

13. The node according to claim 11, wherein the first number (N1) of radiating elements differs compared to the second number (N2) of radiating elements.

14. The node according to claim 1, wherein each radiating element is a dual polarized radiating element.

15. The node according to claim 1, wherein the plurality of subarrays are arranged on an antenna surface, and the first type of subarray and/or the second type of subarray are non-symmetrically arranged over the antenna surface in relation to a symmetry line (L).

16. The node according to claim 1, wherein the plurality of subarrays are arranged on an antenna surface, and the first type of subarray and/or the second type of subarray are symmetrically arranged over the antenna surface in relation to a symmetry line (L).

17. A method for controlling coverage in a telecommunication network with an active antenna system, AAS, the AAS comprising a plurality of subarrays each having multiple radiating elements, the AAS being configured to provide coverage in a coverage angular range and the plurality of subarrays comprising at least two types of subarrays, the method comprising:

configuring a first type of subarray with a first radiation pattern having at least a first angular region with gain below a first threshold value, configuring a second type of subarray with a second radiation pattern having at least a second angular region with gain below a second threshold value, and configuring the second radiation pattern to deviate from the first radiation pattern such that the first angular region in the first radiation pattern differs from the second angular region in the second radiation pattern.

18. The method for controlling coverage according to claim 17, further comprising selecting the first radiation pattern to have a gain above the first threshold value in the second angular region.

19. The method for controlling coverage according to claim 17, further comprising selecting the second radiation pattern to have a gain above the second threshold value in the first angular region.

20. The method for controlling coverage according to claim 17, further comprising selecting the first type of subarray to have different phase taper and/or amplitude taper compared to the second type of subarray to create different radiation patterns.

* * * * *